United States Patent
Qiu et al.

(10) Patent No.: US 12,309,840 B2
(45) Date of Patent: May 20, 2025

(54) METHOD FOR RANDOM ACCESS RESOURCE CONFIGURATION AND RESOURCE SELECTION AND PERFORMING RANDOM ACCESS CHANNEL

(71) Applicant: ZTE Corporation, Shenzhen (CN)

(72) Inventors: Zhihong Qiu, Shenzhen (CN); He Huang, Shenzhen (CN); Xiaojuan Shi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 433 days.

(21) Appl. No.: 17/479,699

(22) Filed: Sep. 20, 2021

(65) Prior Publication Data

US 2022/0007431 A1    Jan. 6, 2022

Related U.S. Application Data

(63) Continuation of application No. PCT/CN2019/080245, filed on Mar. 28, 2019.

(51) Int. Cl.
*H04W 74/0833* (2024.01)
*H04W 72/04* (2023.01)

(52) U.S. Cl.
CPC ....... *H04W 74/0833* (2013.01); *H04W 72/04* (2013.01)

(58) Field of Classification Search
CPC .................. H04W 74/0833; H04W 72/04
USPC ......................................... 370/329
See application file for complete search history.

(56) References Cited

U.S. PATENT DOCUMENTS

| | | | |
|---|---|---|---|
| 11,012,978 B2 * | 5/2021 | Li | H04L 5/0035 |
| 11,064,534 B2 * | 7/2021 | Agiwal | H04W 52/365 |
| 11,166,321 B2 * | 11/2021 | Qian | H04W 4/18 |
| 11,252,753 B2 * | 2/2022 | Chen | H04L 1/1887 |
| 11,284,440 B2 * | 3/2022 | Qian | H04W 16/28 |
| 11,979,918 B2 * | 5/2024 | Agiwal | H04W 74/0841 |
| 2012/0182977 A1 * | 7/2012 | Hooli | H04W 72/20 370/336 |
| 2015/0264718 A1 * | 9/2015 | Yu | H04W 4/70 370/329 |
| 2015/0282213 A1 * | 10/2015 | Sun | H04W 74/0833 370/329 |
| 2015/0289291 A1 * | 10/2015 | Liu | H04W 74/0833 370/329 |

(Continued)

FOREIGN PATENT DOCUMENTS

| | | | | |
|---|---|---|---|---|
| CN | 108260209 A | | 7/2018 | |
| EP | 4255047 A2 * | | 10/2023 | H04B 17/318 |

(Continued)

OTHER PUBLICATIONS

Extended European Search Report regarding EP 19 92 1146 dated Feb. 24, 2022.

(Continued)

*Primary Examiner* — Mong-Thuy T Tran
(74) *Attorney, Agent, or Firm* — Crowell & Moring LLP

(57) ABSTRACT

Method, systems and devices for improved random access resource configuration and resource selection in a random access procedure. Multiple common resource pools are configured to increase random access resource capacity.

11 Claims, 6 Drawing Sheets

(56) References Cited

U.S. PATENT DOCUMENTS

| | | | |
|---|---|---|---|
| 2015/0382205 A1* | 12/2015 | Lee | H04B 7/0617 370/329 |
| 2018/0255585 A1* | 9/2018 | Tirronen | H04W 74/006 |
| 2018/0310344 A1* | 10/2018 | Zhou | H04W 72/04 |
| 2018/0343043 A1 | 11/2018 | Hakola et al. | |
| 2019/0289574 A1* | 9/2019 | Li | H04W 72/02 |
| 2019/0350006 A1* | 11/2019 | Qian | H04W 76/11 |
| 2019/0364602 A1* | 11/2019 | Yi | H04W 72/20 |
| 2020/0100297 A1* | 3/2020 | Agiwal | H04W 52/365 |
| 2020/0367288 A1* | 11/2020 | Dahlman | H04W 74/0833 |
| 2020/0389912 A1* | 12/2020 | Baldemair | H04W 72/20 |
| 2021/0014889 A1* | 1/2021 | Liu | H04W 56/001 |
| 2021/0058132 A1* | 2/2021 | Xu | H04W 74/0833 |
| 2021/0176789 A1* | 6/2021 | Takahashi | H04B 7/088 |
| 2021/0329571 A1* | 10/2021 | Yu | H04W 52/285 |
| 2022/0086774 A1* | 3/2022 | Qian | H04W 72/0446 |

FOREIGN PATENT DOCUMENTS

| | | |
|---|---|---|
| WO | WO2017212104 A1 | 12/2017 |
| WO | WO2018059185 A1 | 4/2018 |
| WO | WO2018131985 A1 | 7/2018 |
| WO | WO 2018/203727 A1 | 11/2018 |

OTHER PUBLICATIONS

Panasonic: "Numerology for Msg2 and Msg4 for RRC_CONNECTED UEs," 3GPP Draft; RI-1718764, 3rd Generation Partnership Project (3GPP), Mobile Competence Centre; 650, Route Deslucioles; F-06921 Sophia_Antipolis Cedex;France vol. RAN WGI, No. Prague, CZ; Oct. 9, 2017-Oct. 13, 2017, Oct. 8, 2017; Retrieved from the Internet:URL:http://www.3gpp.org/ftp/Meetings_3GPP_SYNC/RANI/Docs/ [retrieved on Oct. 8, 2017].

Panasonic: "On Prioritization of Random Access," 3GPP Draft; R2-1710415, 3rd Generation Partnership Project (3GPP), Mobile Competence Centre; 650, Route Des Lucioles; F-06921 Sophia-Antipolis Cedex; France vol. RAN WG2, No. Prague, Czech Republic;Oct. 9, 2017-Oct. 8, 2017, XP051342460, Retrieved from the Internet: URL:http://www.3gpp.org/ftp/Meetings_3GPP_SYNC/RAN2/Docs/ [retrieved on Oct. 8, 2017].

CMCC: "Considerations on support of supplementary uplink frequency," 3GPP Draft; R2-1711824 Considerations on Support of Supplementary Uplink Frequency, 3rd Generation Partnership Project (3GPP), Mobile Competence Centre; 650, Route Des Lucioles; F-06921 Sophia_Antip vol. RAN WG2, No. Prague, Czech; Oct. 9, 2017-Oct. 12, 2017 Oct. 8, 2017, XP051343779, Retrieved from the Internet: URL:http://www.3gpp.org/ftp/Meetings 3GPP_SYNC/RAN2/DOCS/ [retrieved on Oct. 8, 2017].

International Search Report and Written Opinion regarding PCT/CN2019/080245 dated Dec. 30, 2019.

European Office Action Communication pursuant to Article 94(3) EPC regarding Agglication No. 19 921 146. 7 dated Dec. 14, 2023, 6 pages.

* cited by examiner

METHOD FOR RANDOM ACCESS RESOURCE CONFIGURATION AND RESOURCE SELECTION AND PERFORMING RANDOM ACCESS CHANNEL

CROSS-REFERENCE TO RELATED APPLICATION

This application is a continuation application of PCT International Patent Application No. PCT/CN2019/080245, filed with the China National Intellectual Property Administration, PRC on Mar. 28, 2019, which is herein incorporated by reference in its entirety.

TECHNICAL FIELD

This document is directed generally to wireless communications.

BACKGROUND

Wireless communication technologies are moving the world toward an increasingly connected and networked society. Next generation telecommunication systems are providing even wider and more comprehensive coverage and capabilities. Next generation telecommunications systems even will provide communication services through non-terrestrial networks (NTN). These include satellite systems, including low-earth orbit (LEO) satellites, medium-earth orbit (MEO) satellites, geosynchronous earth orbit (GEO) satellites, highly elliptical earth orbit (HEO) satellites and unmanned aircraft systems (UAS). Such systems provide telecommunication services to user equipment and other communication devices that are on or near the ground or are airborne. Expansion of telecommunication service to NTN systems creates new technical problems that require solutions.

SUMMARY

This document relates to methods, systems, and devices for improved telecommunications. For next generation telecommunication systems, larger cell sizes might be used. Cell coverage in the future telecommunications systems can be excessively large. One example is in NTN systems which have typical cell coverage ranges from 100 km to 1000 km in diameter. However, current random access (RA) resource configuration is designed for terrestrial communication whose cell coverage is typically from 5 km to 50 km in diameter. The larger cell size in future systems, including NTN systems as one example, will leads to lack of capacity for random access operations. This can limit the user density that can be supported within the cell. The impact might be even more sever for massive Machine Type Communications (mMTC), which is considered one of the major use cases in next generation communication systems such as 5G.

Moreover, larger cell size will lead to significant transmission delay. The distance from a communication device to a network device may be tens of kilometers to hundreds of kilometers. The transmission delay at such a distance, along with the variability of transmission delays across a cell, will be significant and must be accommodated. Thus an enhancement of random access procedure may also be required.

The above and other aspects and their implementations are described in greater detail in the drawings, the descriptions, and the claims.

DETAILED DESCRIPTION

The presently disclosed embodiments relate generally to telecommunication systems. More particularly, the presently disclosed embodiments relate to method and system for random access resource configuration and resource selection and performing random access on a random access channel.

Figure 1:
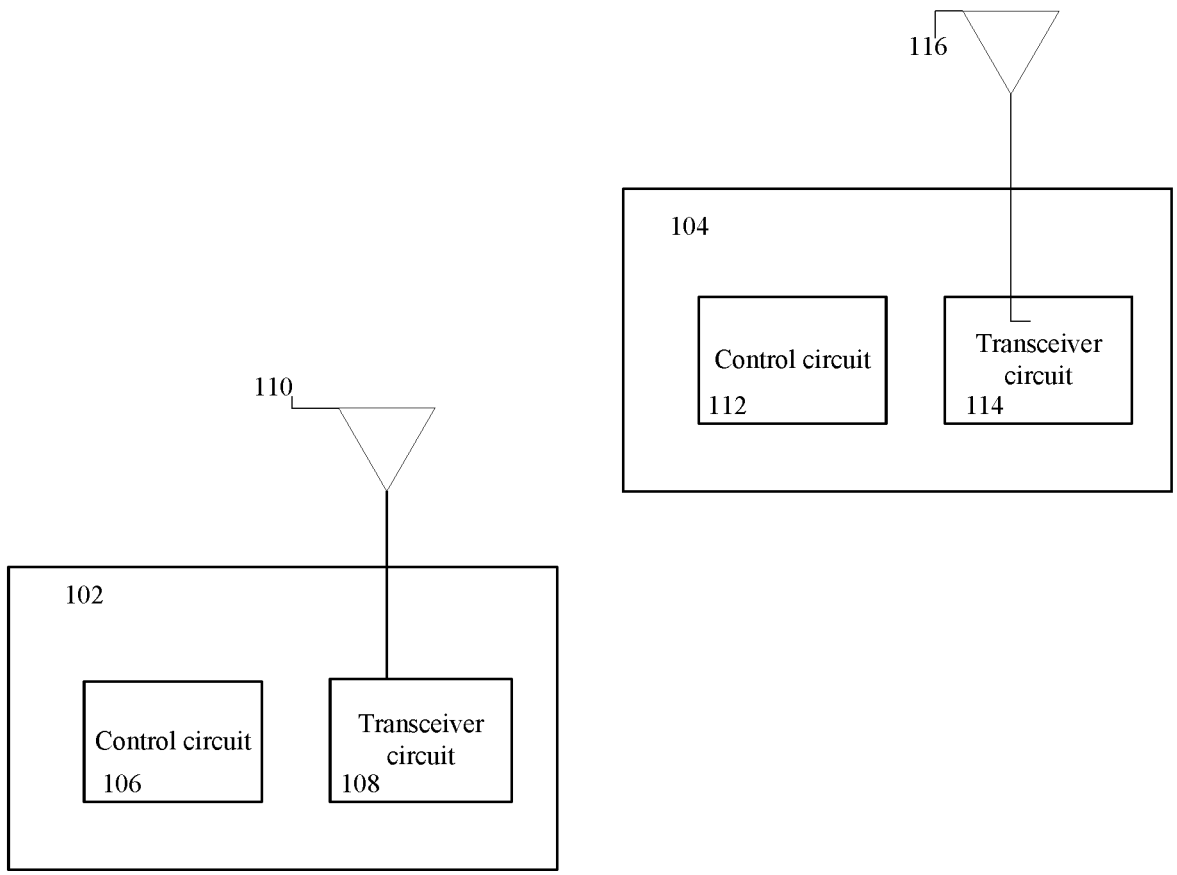
FIG. 1 shows an example of a communications system.

Referring now to the drawing, FIG. 1 is an example block diagram of a communication system 100. In the example, the communication system 100 includes a communication device 102 and a network device 104. In other embodiments, the communication system 100 may include other types and number of devices, including other network devices and other communication devices.

The communication device 102 includes a control circuit 106, a transceiver circuit 108 and an antenna 110. The control circuit 106 includes electronics for controlling operation of the communication device 104, such as one or more processors and memory for storing data and instructions for the processors. The transceiver circuit 108 includes a transmitter and receiver for radio communication using the antenna 110, for example on the communication system 100 with the network device 104. The transceiver circuit 108 includes electronics such as processors and memory for processing data, timing electronics for managing timing aspects of radio communication, etc.

The network device 104 includes a control circuit 112, a transceiver circuit 114 and an antenna 116. The control circuit 112 includes electronics for controlling operation of the communication device 104, including one or more processors and memory for storing data and instructions for the processors. The transceiver circuit 114 includes a transmitter and receiver for radio communication using the antenna 116, for example on the communication system 100 with the communication device 102. The transceiver circuit 114 includes electronics such as processors and memory for processing data, timing electronics for managing timing aspects of radio communication, etc. The network device may further include network communication equipment (not shown) for communication with one or more other network devices and for other communication networks such as cellular and landline telecommunication networks.

In some embodiments, the communication system 100 including the communication device 102 and the network device 104 form part of a 5G or 3GPP communication network and operate according to air interface standards for such network. In one embodiment, the communication system including the network device 104 is part of a non-terrestrial network (NTN), in which case the network device may be one or more satellites or UAS platforms. Such a satellite or UAS platform provides telecommunication services to communication devices such as the communication device 102 in a cell or service area, such as on the ground. The satellite or UAS platform is in further radio communication with one or more terrestrial gateways or one or more satellites to provide telecommunication services for the communication device 102. The satellite or UAS platform is referred to herein for convenience as a next generation node B or gNB. Similarly, the communication device may be referred to herein a user equipment or UE.

While the features and advantages of the illustrated embodiments are described in conjunction with a 5G NTN, the claims are not so limited. The features and embodiments shown and claimed herein may be extended to any suitable communication network or system, whether terrestrial or non-terrestrial.

The communication device 102 may initiate communication with the network device through a random access (RA) procedure using a physical random access channel (PRACH) and/or a physical uplink shared channel (PUSCH). A transmitting device (such as the communication device 102 or the network device 104) and a receiving device (such as the network device 104 and the communication device 102) use commonly defined radio channels for reliable communication.

To access a radio communication network, a communication device may make use of a set of configured RA resources for accessing to the communication network. The procedure is referred to as random access or RACH. In this convention RACH can be conventional 4-step RACH, or 2-step RACH or any other specified procedure utilizing RA resource for accessing to the radio.

According to some current radio communication standard specifications, there is provided only one common resource pool with up to eight Msg1-FDMs, 256 PRACH-ConfigurationIndex and 64 preambles for performing Random Access procedure, which can limit the user density to be supported in communication system with large cell size.

To solve this technical problem, multiple common and/or dedicated random access (RA) resource pools may be configured. Further, the frequency domain of common resource pools may be extended. In this manner, the RACH configuration is enhanced. RACH capacity is increased by extending the common resource pools for contention-based random access (CBRA). Generally, two procedures occur. First, a UE receives the configuration for multiple RA resource pools from a network device through either system information or dedicated signaling Second, the UE selects one or more RA resource from the RA resource pools received for initiating RACH procedure RACH procedure can be conventional 4-step RACH or 2-step RACH or other procedure for accessing to the network.

RA resource pool refers to a set of RA resources. RA resources can include transmission resources for a preamble and/or transmission resources for a payload and/or configuration of RA response window (i.e. length of RA response window, offset for start of RA response window.) Transmission resources for a preamble include at least one of the following: the location of the preamble transmission resource in time domain, the location of the preamble transmission resource in frequency domain, the location of the preamble transmission resource in code domain (i.e. preamble index, preamble format, root sequence or other parameters required for generating preamble), parameters using for controlling transmission power of preamble (i.e. target received power of preamble, power ramping step of preamble) and maximum allowable transmission time of preamble. Transmission resources for a payload can include at least one of the following: the location of payload transmission resource in time domain, the location of payload transmission resource in frequency domain, the location of the payload transmission resource in code domain (e.g. Orthogonal code, non-Orthogonal code, or some other code which will be used in physical layer), the bandwidth or physical resource block (PRB) used for payload transmission, the allowed transport block (TB) size for payload and the allowed (modulation coding scheme) MCS for payload, the UCI for payload transmission, parameters using for controlling transmission power of payload (i.e. target received power of payload, power ramping step of payload transmission, power difference between payload and preamble transmission) and maximum allowable transmission time of payload. Different RA resource pool can have different configuration of RA resources.

One or multiple RA resource pools can be configured per cell, per beam or per bandwidth part (BWP). In one embodiment, one or multiple RA resource pools can be configured per cell or per beam. In other embodiments, multiple BWP or an initial BWP can be configured to UE. For each BWP, one or multiple RA resource pool can be configured according to multiple embodiments or options. In a first embodiment, a RA resource index list can be configured per BWP, where RA resource index refers to RA resource pool identifier. In a second embodiment, a bitmap of RA resources can be configured per BWP, where each bit refers to a RA resource pool configured.

The system and method are highly flexible. In one example, one or multiple RA resource pools can be common to all UEs. In a second example, some UEs are incapable of supporting one or more new resource pools. In that case, a default resource pool can be defined for UEs incapable of supporting a new resource pool. In that case, the configuration of the default RA resource is either as specified in an existing communications protocol, or the configuration of the default RA resource may be newly defined as a new resource pool. The UE can differentiate the default RA resource pool by one of several methods. First, a pre-defined Resource ID, e.g. resource pool ID equals '0," is reserved for the default resource pool. Second, separated information elements (IEs) may be assigned for the default RA resource pool and additional configured RA resource pools respectively. UE which are incapable of supporting multiple resource pools may decode the IE for the default RA resource while a UE capable of supporting multiple resource pools will decode both IEs to obtain the RA configuration for all RA resource configured.

In a third example, multiple RA resource pools can be configured for different triggering events. Triggering events can be defined as a particular circumstance or action that requires a RA procedure. As one example, dedicated resource pools can be configured for specific triggering events, such as for reconfiguration with synchronization. When a dedicated resource is configured for reconfiguration with sync, a type indicator can be included in reconfiguration with sync for the gNB to indicate to the UE which type of RACH to initiate.

In a fourth example, multiple resource pools can be configured for different RACH types. RACH type can be conventional 4-step RACH, 2-step RACH or other procedure utilizing RA resource for getting access to the network. A respective resource pool can be defined for or designated for each respective RACH type to thereby expand the resource pools.

Still further, any suitable combination of above these examples can be considered for RA resource pool configuration. For example, for each RACH type, multiple resource pools can be configured. For the resource pools configured for each RACH type, separated resource pools can be further configured for different triggering events.

Further, when multiple resource pools are configured, separated power control indicators can be configured for each resource pool for assisting power control.

For all alternatives mentioned above, RA resource configuration can be indicated to the UE via system information or dedicated radio resource control (RRC) signaling from one or more network devices.

Figure 2:
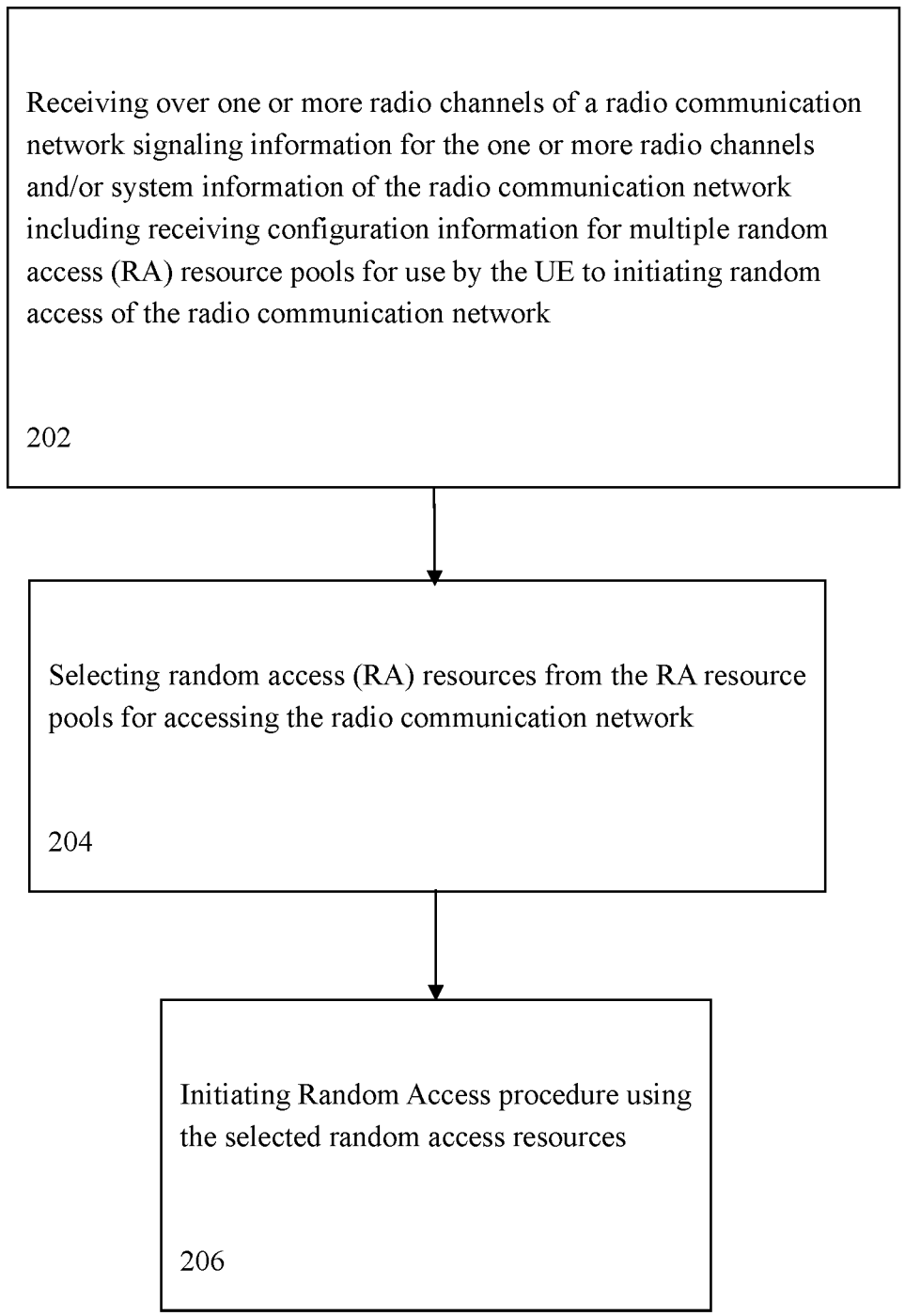
FIGS. 2 and 3 show example methods for communication in the communication network of FIG. 1.
Figure 3:
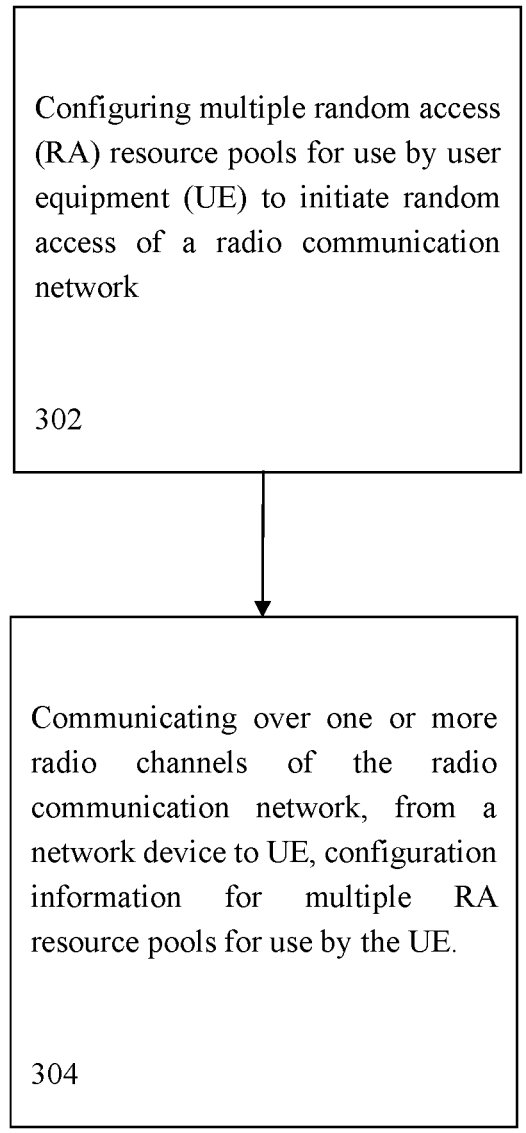

FIGS. 2 and 3 show example methods for communication in the communication network of FIG. 1. The method of FIG. 2 may be used for selecting RA resources by a UE. At block 202, the method includes receiving over one or more radio channels of a radio communication network signaling information for the one or more radio channels and/or system information of the radio communication network. This includes receiving configuration information for multiple random access (RA) resource pools for use by the UE during random access of the radio communication network. Block 204 includes selecting random access (RA) resources from the RA resource pools for accessing the radio communication network, and block 20 includes initiating a random access procedure to access the radio communication network using the selected random access resources.

Block 204, selecting RA resources by the UE can be accomplished in the widest variety of ways. In one example, the UE can select the resources randomly. In another example, if the UE is able to support a additional configured resource pool, the UE should select that additional configured resource pool. That leaves previously existing resource pools available for use by UE which cannot support the additional configured resource pool.

In a third example block 204 can include allocation of some factor for each resource pool. In this example, the UE may generate a random value and determine the selected resource pool by comparing the random value and the configured factor. As one example, if the random number is in the range [0-0.3), select the first resource pool. If the random number is in the range [0.3, 0.7), select the second resource pool, and if the random number is in the range [0.7,1) select the third resource pool. Any suitable scheme may be used.

In a fourth example, in executing block 204 a UE select the RA resource pool based on an identifying number for the UE, such as 5G-S-TMSI, or part of 5G-S-TMSI, IMSI or any other mobile identity number. For example the UE could select the resource pool with index equal to UE ID mod N, where N=the number of resource pool. Other examples could be used as well.

In a fifth example, the UE can select the RA resource pool based on a measurement result or result calculated based on the measurement. The measurement may be some aspect of a radio channel which the UE is configured to measure and store. For example, a threshold or multiple thresholds can be configured to UE and the UE then can select the RA resource pool based on the threshold. Example of suitable measurement results or threshold can include reference signal received power (RSRP) reference signal received quality (RSRQ), path loss, power headroom report (PHR) or signal to noise ratio (SNR) or combination of above, Other suitable measurement or results calculated based on measurements can be used as well.

In a sixth example, block 204 can include selection by the UE of bandwidth part (BWP) first, and then selecting the RA resource pool within the BWP selected. To achieve this, multiple BWP or an initial BWP can be configured to the UE through either system information or dedicated signaling from the network device. Moreover, the selection of a BWP or an initial BWP can be processed based on a method similar to the other examples here of selecting RA resources.

In a seventh example, the UE selects the RA resource based on the purpose for which the RA procedure is initiated. The purpose or reason for the RA procedure may be defined by one or more triggering events. In this case, the mapping between triggering events and RA resource is indicated to UE via system information or RRC signaling from a network device.

In an eighth example, block 204 may include selection by the UE of an uplink carrier first, then selection of an RA resource within the selected uplink carrier. For example, a supplementary uplink carrier can be configured for this cell. Further, the selection of the uplink carrier can be based on a method similar to the other examples here of selecting RA resources. Moreover, the selection of the uplink carrier can be provided to the UE by RRC signaling.

In a ninth example, the UE selects a RA resource based on RACH type. In one example of this method, a respective separated resource pool can be configured for each respective RACH type. The UE may first select a RACH type, then select an RA resource within the resource pool configured for the selected RACH type. For the RACH type selection, any of the examples for block 204 may be used, alone or in combination. In an example, dedicated resource can be configured for reconfiguration with synchronization, a type indicator can be included in reconfiguration with sync from the gNB to indicate to the UE which type of RACH to initiate.

It should be further noted that any suitable combination of these exemplary alternatives may be used to select a resource pool. Other examples may be used as well.

The method of FIG. 3 may be used for configuring RA resources to a UE by a network device such as gNB. At block 302, the network device configures one or multiple random access (RA) resource pools for use by user equipment (UE) to initiate random access of a radio communication network. Any suitable configuring may be done, including the examples provided above in connection with block 204 of FIG. 2. At block 304, the network device communicates over one or more radio channels of the radio communication network to the UE configuration information for one or multiple RA resource pools for use by the UE during random access of the radio communication network. As noted above, the communication of the configuration information may be by system information, signaling information, e.g RRC signalling, etc. The UE can store the configuration for subsequent use.

A further issue for the UE relates to how to distinguish communications from a network device from different resource pools.

The first method involves separated control resource sets (CORESETs). This method involves a mapping relationship between the CORESET and the RA resource pool and configuring the mapping to UE.

In a first alternative, multiple CORESETs can be configured to the UE together with a mapping between CORESETs and resource pools. Once the RA resource pool is selected, the UE only monitors the RA response on the CORESET which is linked to the resource pool selected. In this example, one or multiple CORESETs can be configured per RA resource pool. In one example, a CORESET bitmap is configured per RA resource pool. For the CORESET bitmap, each bit refers to a CORESET that has been configured. For example, three CORESETs are configured and the bitmap 00000001 means the first CORESET will be used for the RA resource pool. In another example, a CORESET index list can be configured per RA resource pool. The index refers to the CORESET identity or the sequence of a CORESET in a CORESET configuration list.

In a second alternative, one or multiple RA resource pools can be configured per CORESET. For example, a RA resource index list is configured per CORESET. The index may refer to a RA resource pool identifier, or a RA resource identifier, which is determined by the sequence of RA configuration in the RA configuration list. Or, the index may refer to a location of RA resource. The location can be a frequency domain location and/or a time domain location and/or a code domain location.

A second option for this second alternative is configuring a RA resource bitmap for each CORESET. For the RA resource bitmap, each bit refers to a RA resource pool identifier, or a RA resource identifier, which is determined by the sequence of RA configuration in the RA configuration list, or a location of an RA resource. The location can be a frequency domain location, and/or a time domain location and/or a code domain location.

In addition to mapping the relationship between CORESET and the RA resource pool, a second method for distinguishing RA response messages includes a mapping relationship between search space (SS) and RA resource pools and configuring the mapping relationship to UE. Multiple SS can be configured to the UE with mapping between each respective SS and each respective resource pool. Once an RA resource pool is selected, UE only monitors for an RA response on the SS linked to the selected resource pool. Using this method, in one alternative, one or multiple SS can be configured per RA resource pool. In a first option, a SS bitmap is configured per each RA resource pool. For the SS bitmap, each bit refers to a SS configured to the UE. In a second option, a SS index list can be configured per RA resource pool. The index refers to the SS identifier or the sequence of the SS in and SS configuration list.

In a second alternative, one or multiple RA resource pool can be configured per SS. In this example, a RA resource index list is configured per SS. The index may refer to RA resource pool identifier, or RA resource ID, which is determined by the sequence of RA configuration in the RA configuration list, or the location of the RA resource. The location can be a frequency domain location, and/or a time domain location and/or a code domain location.

A second option for configuring one or multiple RA resource pools per SS can include configuring an RA resource bitmap for each SS. For the RA resource bitmap, each bit may refer to a RA resource pool ID, or a RA resource identifier, which is determined by the sequence of the RA configuration in the RA configuration list, or a location of the RA resource. The location can be a frequency domain location and/or a time domain location and/or a code domain location.

Another alternative solution to distinguishing random access response messages can involve using downlink control information (DCI). A resource indicator can be included in DCI to indicate which RA resource the Random Access Response is intended for. This may include an indicator in DCI to indicate the RA resource pool ID. This may include an indicator in DCI to indicate the RA resource index, which is determined by the sequence of the RA configuration in the RA configuration list. Or this may include an indicator in DCI to indicate the location of the RA resource, where the location can be a frequency domain location and/or a time domain location and/or a code domain location.

Another alternative solution to distinguishing random access response messages can involve including a resource indicator in the RA response message. A resource indicator can be included in the RA response message to indicate to the UE which RA resource the RA response is intended for. The resource indicator can be used to indicate at least one of the following: an RA resource pool ID, or an RA resource index, which is determined by the sequence of the RA configuration in the RA configuration list, or the location of the RA resource, where the location can be a frequency domain location and/or a time domain location and/or a code domain location.

In some embodiments, the resource indicator can be included in the RA response message payload. In other embodiments, the resource indicator can be included in the RA response message subheader. For example, a reserved bit in a current RA response message payload can be used as the resource indicator. Alternatively, the format of the RA response message payload can be considered to introduce a resource indicator. Still further, a new defined RA response message subheader is defined to support distinguishing RA response messages from different resource pools.

One example is shown here:

| E | T1 | T2 | R | R | R | NoRP | Oct1 |
|---|----|----|---|---|---|------|------|
| NoRP | | | | RAPID | | | Oct2 |

The elements of this subheader may be defined as follows:
  E: Extension field, "0" means MAC SDU correspondent to this header is the last MAC SUD; "1" means there is at least a subsequent MAC SDU.
  T1: First Type field, a flag indicating whether multiple resource pool is configured. "0" to indicate there is only one common resource, in this case RPID field is set to reserved. Otherwise, T1 is set to "1", and RPID is used to indicate MAC SDU including this subheader is intended for which resource pool.
  T2: Second type field, "0" means this subheader contains BI indicator while set to "1" means this subheader contains RAPID.
  R: Reserved bit, set to "0"
  RPID: ResourcePool ID, used to indicate which RA resource pool this MAC SDU is intended for.
  RAPID: The Random Access Preamble IDentifier field identifies the transmitted Random Access Preamble Another alternative solution to distinguishing random access response messages can involve using a radio network temporary identifier, e.g., random access radio network temporary identifier (RA-RNTI). In an example RA-RNTI can be used to distinguish RA response messages for different resource pools. Several options can be considered. For example, in a first option, a resource pool identifier could be used for RA-RNTI calculation. Alternatively, a frequency offset in the frequency domain could be included for RA-RNTI calculation. Or, configurable length of f_id could be defined.

The resource pool identifier may be introduced as part of the RA-RNTI formula:

$$RA\text{-}RNTI = 1 + s\_id + 14 \times t\_id + 14 \times 80 \times f\_id + 14 \times 80 \times 8 \times r\_id + 14 \times 80 \times 8 \times 1 \times N\_r\_id \times ul\_carrier\_id,$$

where s_id is the index of the first OFDM symbol of the specified PRACH,
  t_id is the index of the first slot of the specified PRACH in a system frame,
  f_id is the index of the specified PRACH in the frequency domain,
  r_id is the index of the selected resource pool ($0 \leq r\_id \leq N\_r\_id$),
  N_r_id is the total RA resource pool configured and ul_carrier_id is the UL carrier used for Msg1 transmission (0 for NUL carrier, and 1 for SUL carrier).

In a second option, a frequency offset is included in the frequency domain. If more than one resource pool is configured, msg1_FrequencyIndexStartOffsets will be configured for additional resource pools as the starting frequency index of each resource pool. The starting frequency index of first resource pool is 0. For example, there are three total resource pools configured, resource pool1 has four FDMs, resource pool2 has six FDMs and resource pool3 has five FDMs, then msg1_FrequencyIndexStartOffset1 for resource pool2 is 4, msg1_FrequencyIndexStartOffset2 for resource pool3 is 11.

In this option, RA-RNTI computes as:

$$\text{RA-RNTI}=1+s\_id+14 \times t\_id+14 \times 80 \times f\_id+14 \times 80 \times max\_no\_fid \times ul\_carrier\_id,$$

where s_id is the index of the first OFDM symbol of the specified PRACH, t_id is the index of the first slot of the specified PRACH in a system frame, f_id is the index of the specified PRACH in the frequency domain, and the f_id numbering starts from msg1_FrequencyIndexStartOffset if configured and max_no_fid is the maximum FDM configured. ul_carrier_id is the UL carrier used for Msg1 transmission (0 for NUL carrier, and 1 for SUL carrier).

In a third option, define a configurable length of f_id, and the f_id can be an id which across all the RA resource pools. A configurable range of f_id is supported with maximum FDM increased to max_no_fid.

In this option, RA-RNTI is computed as:

$$\text{RA-RNTI}=1+s\_id+14 \times t\_id+14 \times 80 \times f\_id+14 \times 80 \times max\_no\_fid \times ul\_carrier\_id$$

where s_id is the index of the first OFDM symbol of the specified PRACH, t_id is the index of the first slot of the specified PRACH in a system frame, f_id is the index of the specified PRACH in the frequency domain ($0<=f\_id<max\_no\_fid$), max_no_fid is the maximum FDM supported. ul_carrier_id is the UL carrier used for Msg1 transmission (0 for NUL carrier, and 1 for SUL carrier).

Another alternative solution to distinguishing random access response messages can involve using bandwidth parts (BWP). In this alternative, the UE only monitors for an RA response message on CORESET/SS on the selected BWP and/or CORESET/SS on an initial BWP. For each BWP, one or multiple CORESET/SS can be configured for monitoring the RA response message.

A cell level RA indicator can be included in system information or RRC signaling to indicate to a UE to use a new defined format for performing Random Access. Or, UE based on the PLMN type to decide whether to use the new defined format for performing Random Access or not. e.g., if it's a NTN cell, UE uses new defined format.

A further technical problem relates to retransmission of a preamble when a RACH attempt fails. For the case of preamble retransmission, several alternatives can be considered.

In a first alternative, the UE is allowed to reselect an RA resource through all the resource pools configured. In a second alternative, once the RA resource pool is selected, the UE can make the RA resource selection within the selected resource pool. In a third alternative, a counter for reselection of RA resource pool can be configured to the UE. For example, the counter can be increased in every preamble retransmission, and will be reset when RA resource pool selection/reselection is performed. In this example, the UE is only allowed to reselect the RA resources pool (i.e. select the RA resource from other resource pool) until the counter reach the maximum value. In a fourth alternative, a timer for reselection of the RA resource pool can be configured to the UE. The timer is started/restarted when the RA selection of resource pool is performed. The length or duration of the timer is predefined or configured for each RA resource pool and is delivered to UE by system information or dedicated RRC signaling. During the running of timer, UE selects an RA resource within the selected RA resource pool. The UE is allowed to reselect RA resource pool after expiry of timer.

For two-step RACH, since RA response of the two-step RACH might contain common control channel (CCCH) message, e.g. RRCConnectionSetup, more processing time might be considered for reception of RA response. In case of CU-DU (central unit-distribution unit) split, front-haul delay shall be additionally considered for the design of RACH procedure as well.

There are several options for handling the RA response message window. In a first option, a configurable offset can be introduced to delay the start of RA response window. In this case, different offset can be configured for common and dedicated RA resource separately.

In a second option, the RA response window length can be extended, and the length can be configurable. Separate RA response window length can be configured for common and dedicated RA resource separately.

In a third option, an indicator can be included in the RA response message. For the third option, an indicator can be included in the RA response message to indicate to the UE to continue to monitor PDCCH in a second window, where the window length can be configured in either system information or dedicated RRC signaling (e.g. RRC reconfiguration); or indicated in the RA response message itself. For the third indication, the following information may be included:

1 bit indication, to indicate the UE, which is identified by the PREAMBLE ID or CONTENTION RESOLUTION ID included in the sub MAC PDU, to monitor the C-RNTI in the second window. If length of second window and/or start offset is included in the indication, then the 1 bit indication is not needed (i.e. if the length of second window or start offset is configured, then the UE should monitor the C-RNTI in the second window).
  Length of second window. This information can either be included in the RAR or be pre-configured by either system information or dedicated RRC signaling (RRC reconfiguration).
  Start offset of the second window, the offset can be configured in the granularity of ms or slot (i.e. number of slot) or sub frame (i.e. number of subframe), UE use this information to determine when the second window should be started. For example, in case the start offset is configured as n ms, then the second window shall be started n ms later. This information can either be included in the RAR or be pre-configured by either system information or dedicated RRC signaling (RRC reconfiguration).

A fourth option is early C-RNTI monitoring. This is for the case C-RNTI is already included in random access request message (i.e. in the payload of MsgA in 2-step RACH). The UE will monitor PDCCH scrambled with C-RNTI regardless the start of RA response window. The fourth option further requires monitoring PDCCH scrambled with RA-RNTI, where the start of RA response window can be configured as in the first alternative above involving a configurable offset.

Figure 4:
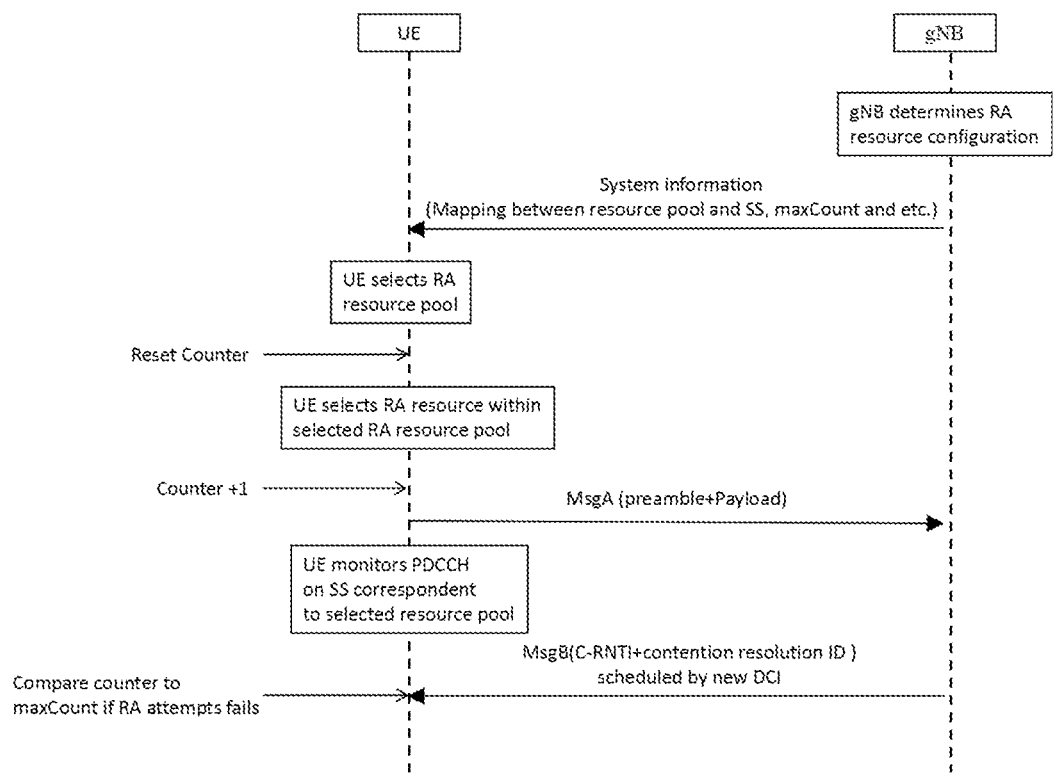
FIGS. 4-6 are example timing flow diagrams illustrating communication in the communication network of FIG. 1.
Figure 5:
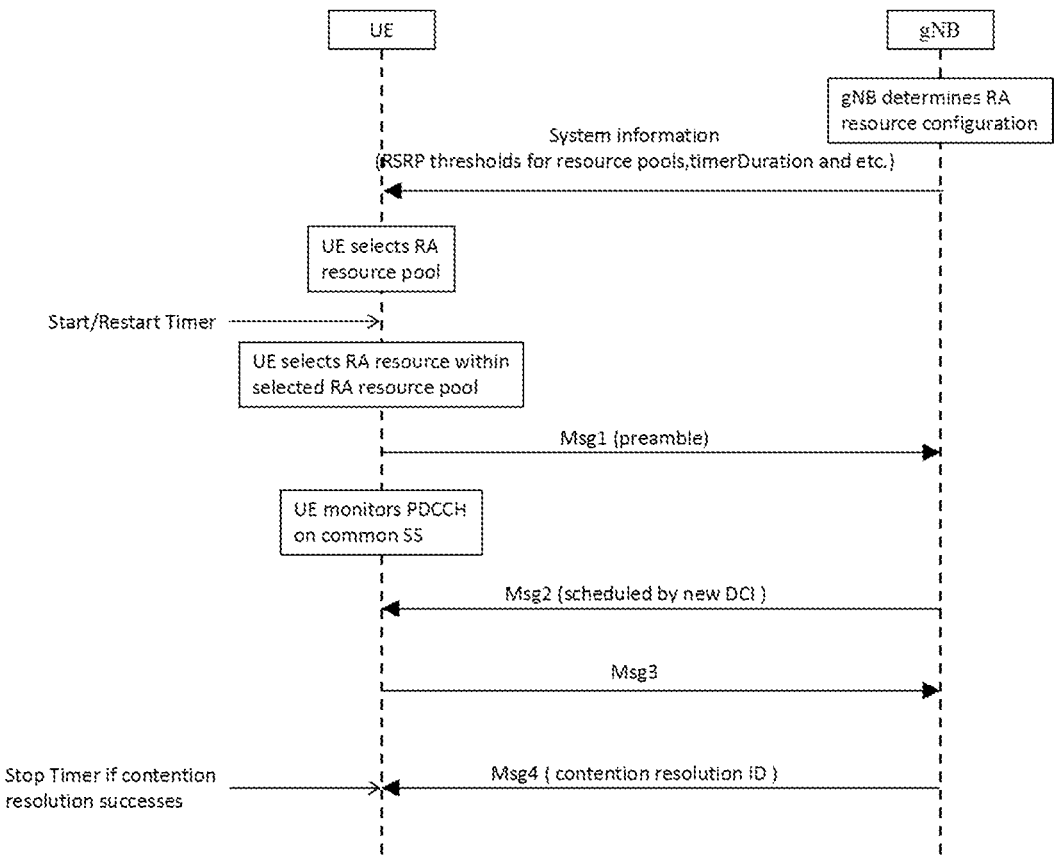
Figure 6:
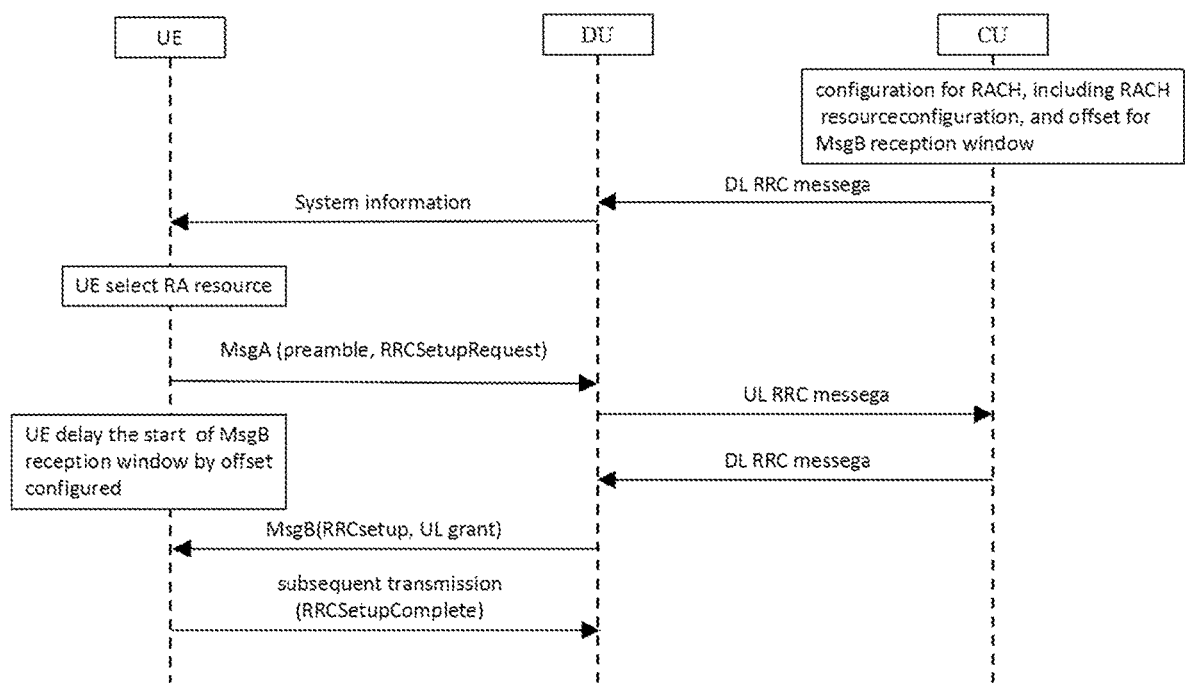

FIGS. 4-6 are example timing flow diagrams illustrating communication in the communication network of FIG. 1. FIG. 4 illustrates a two-step RACH procedure with multiple RA resource pools configured. In a first step, the UE obtains RA resource configuration from system information, including factors allocated to each resource pool, the mapping relationship between resource pools and Search Spaces (SS) and a maximum value of the counter for RA resource pool reselection, maxCount. An indicator is also included in system information to indicate UE to use new format for performing Random access procedure.

In a second step, the UE generates a random value and selects the RA resource pool by comparing the random value to the configured factors. Once RA resource pool is selected, the UE resets the counter to 0. Next, the UE selects an RA resource within the selected RA resource pool, and increases counter by one.

In a third step, the UE sends MsgA via selected RA resource. After transmission of MsgA, the UE monitors PDCCH scrambled with RA-RNTI in Search Space correspondent to the selected resource pool within ra-ResponseWindow. In a fourth step, the UE receives MsgB in the time-frequency location indicated in correspondent PDCCH. If contention resolution is successful, UE consider this RACH successfully completed. Else if RA attempt fails and counter is less than or equal to maxCount, the UE reselects RA resource within selected RA resource pool, otherwise if counter is larger than maxCount, UE reselects RA resource pools.

FIG. 5 shows a four-step RACH procedure with multiple RA resource pools configured. In a first step, the UE obtains a RA resource configuration from system information, including RSRP thresholds for separated RA resource pools, length of timer for resource pool reselection, timerDuration.

In a second step, the UE compares RSRP derived from layer 1 measurement with thresholds for each RA resource pool configured, and selects an RA resource pool based on comparison results. Once the RA resource pool is selected, UE starts/restarts timer. Further, during running of the timer, the UE selects an RA resource within selected resource pool. If timer expires, UE reselects RA resource pool.

In a third step, the UE sends Msg1 via selected time-frequency resources. After transmission of Msg1, UE monitors PDCCH scrambled with RA-RNTI in common Search Space. In a fourth step, the UE receives Msg2 in the PDSCH correspondent to the DCI whose resource indicator is the same with the selected resource pool index.

In a fifth step, the UE sends Msg3 in the UL grant indicated in RA response messages, and monitors PDCCH scrambled with correspondent TC-RNTI. In a sixth step, the UE receives Msg4 in the time-frequency location indicated by correspondent DCI. If Msg4 contains the contention resolution ID correspondent to transmitted Msg3, the UE considers the contention resolution successful, set C-RNTI to the value of TC-RNTI, and stops timer.

In a seventh step, if the RA attempts fails, and timer is running, the UE selects an RA within selected resource pool. Otherwise if the timer expires, the UE reselects RA resource pool.

FIG. 6 shows an example of twos-step RACH procedure in the case of CU-DU split. Here, the UE initiate 2 step RACH in RACH resource configured. In a first step, the UE obtains RA resource configuration from system information, including configuration of RA resource pools, and an offset value for MsgB reception window. A RA indicator is also included in system information to indicate UE to use new format.

In a second step, the UE randomly selects the RA resource pool, and then selects an RA resource within the resource pool. In a third step, the UE sends MsgA (including RRC-setupRequest) via the selected RA resource. After transmission of MsgA, the UE delays the start of the RA response window by an offset value configured in system information, and monitors PDCCH for MsgB reception.

In a fourth step, the UE receives MsgB (including RRC Setup) whose contentionResolution ID is correspondent to that in MsgA. In a fifth step, ☐ STEP 5: UE transmit subsequent transmission (RRCSetupComplete) on the resource granted in MsgB.

From the foregoing, it can be seen that the presently disclosed embodiments provide improvements in random access resource selection and in performing a RACH process.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

The invention claimed is:

1. A method comprising:
   configuring multiple random access (RA) resource pools for use by user equipment (UE) during random access of a radio communication network; and
   communicating over one or more radio channels of the radio communication network, from a network device to UE, configuration information for multiple RA resource pools for use by the UE during random access of the radio communication network, so that the UE is configured to:
   select, from the multiple RA resource pools based on an identifying number for the UE and a number of the multiple RA resource pools, a RA resource pool,
   wherein the RA resource pool is selected with its index being equal to UE ID mod N, the UE ID is the identifying number for the UE, and N is the number of the multiple RA resource pools.

2. The method of claim 1 wherein the configuration information for multiple RA resource pools is communicated in signaling information for the one or more radio channels.

3. The method of claim 1 wherein the configuration information for multiple RA resource pools is communicated in system information of the radio communication network.

4. The method of claim 1 wherein configuring multiple RA resource pools comprises:
   identifying a plurality of events triggering a random access procedure; and
   for each respective triggering event of the plurality of triggering events, dedicating one or more respective resource pools.

5. The method of claim 1 wherein configuring multiple RA resource pools comprises:
   identifying a plurality of random access types; and
   for each respective random access type of the plurality of access types, dedicating one or more respective resource pools.

6. The method of claim 1 wherein configuring multiple RA resource pools comprises:
   configuring a power control indicator for each respective resource pool of the multiple resource pools.

7. A wireless communications apparatus comprising a processor and a memory, wherein the processor is configured to read code from the memory and implement a method recited in claim 1.

8. A non-transitory computer program product comprising a computer-readable program medium code stored thereupon, the code, when executed by a processor, causing the processor to implement a method recited in claim 1.

9. A method comprising:
   at a user equipment (UE), receiving over one or more radio channels of a radio communication network signaling information for the one or more radio channels and system information of the radio communication network including receiving configuration information for multiple random access (RA) resource pools for use by the UE during random access of the radio communication network;
   at the UE, selecting a random access (RA) resource pool from the RA resource pools for accessing the radio communication network by:
   selecting, from the RA resource pools based on an identifying number for the UE and a number of the multiple RA resource pools, the RA resource pool, wherein the RA resource pool is selected with its index being equal to UE ID mod N, the UE ID is the identifying number for the UE, and N is the number of the multiple RA resource pools; and
   initiating a random access process to access the radio communication network using the selected RA resource pool.

10. A wireless communications apparatus comprising a processor and a memory, wherein the processor is configured to read code from the memory and implement a method recited in claim 9.

11. A non-transitory computer program product comprising a computer-readable program medium code stored thereupon, the code, when executed by a processor, causing the processor to implement a method recited in claim 9.

* * * * *